US008184042B2

(12) United States Patent
Ray et al.

(10) Patent No.: US 8,184,042 B2
(45) Date of Patent: May 22, 2012

(54) SELF CALIBRATING CONFORMAL PHASED ARRAY

(75) Inventors: Gary A. Ray, Issaquah, WA (US); Robert Tilman Worl, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 12/497,491

(22) Filed: Jul. 2, 2009

(65) Prior Publication Data

US 2011/0001660 A1 Jan. 6, 2011

(51) Int. Cl.
*G01S 7/40* (2006.01)

(52) U.S. Cl. .......................................................... 342/174

(58) Field of Classification Search .................. 342/174, 342/173, 165, 169–172
See application file for complete search history.

(56) References Cited

U.S. PATENT DOCUMENTS

| | | | | |
|---|---|---|---|---|
| 5,248,982 | A * | 9/1993 | Reinhardt et al. | 342/375 |
| 5,412,414 | A * | 5/1995 | Ast et al. | 342/174 |
| 5,572,219 | A | 11/1996 | Silverstein et al. | |
| 5,682,165 | A * | 10/1997 | Lewis et al. | 342/174 |
| 6,037,898 | A * | 3/2000 | Parish et al. | 342/174 |
| 6,088,385 | A * | 7/2000 | Liu | 375/219 |
| 6,127,966 | A * | 10/2000 | Erhage | 342/174 |
| 6,157,343 | A * | 12/2000 | Andersson et al. | 342/371 |
| 6,208,287 | B1 * | 3/2001 | Sikina et al. | 342/174 |
| 6,252,542 | B1 * | 6/2001 | Sikina et al. | 342/174 |
| 6,320,538 | B1 | 11/2001 | Lalezari et al. | |
| 6,333,712 | B1 | 12/2001 | Haugse et al. | |
| 6,339,399 | B1 * | 1/2002 | Andersson et al. | 342/372 |
| 6,466,160 | B2 * | 10/2002 | Rexberg | 342/174 |
| 6,515,616 | B1 * | 2/2003 | Kuplicki | 342/174 |
| 7,576,686 | B2 * | 8/2009 | Needham et al. | 342/174 |
| 7,714,775 | B2 * | 5/2010 | Navarro et al. | 342/174 |
| 7,911,376 | B2 * | 3/2011 | Hardacker et al. | 342/174 |
| 2002/0140601 | A1 * | 10/2002 | Sanada et al. | 342/368 |
| 2004/0061644 | A1 | 4/2004 | Lier et al. | |
| 2005/0156781 | A1 * | 7/2005 | Coleman et al. | 342/174 |
| 2006/0114147 | A1 * | 6/2006 | Boonstra et al. | 342/174 |
| 2008/0278386 | A1 | 11/2008 | Hall et al. | |
| 2010/0073220 | A1 * | 3/2010 | Olesen et al. | 342/174 |

(Continued)

OTHER PUBLICATIONS

Santori, A.; , "Sensor self-calibration methods for a passive conformal airborne antenna," Radar Conference—Surveillance for a Safer World, 2009. RADAR, International , vol., No., pp. 1-5, Oct. 12-16, 2009.*

(Continued)

*Primary Examiner* — John B Sotomayor
(74) *Attorney, Agent, or Firm* — Vista IP Law Group LLP; Cynthia A. Dixon

(57) ABSTRACT

A system and method for a self calibrating conformal phased array are disclosed involving a plurality of transmit/receive elements; a plurality of embedded, calibration transmit/receive elements scattered across the array; and at least one back-end processor. The calibration transmit/receive elements are used to track any physical calibration transmit/receive element's relative position change caused by array flexure. In one or more embodiments, each of the calibration transmit/receive elements transmit a tone using a small antenna, and the other calibration transmit/receive elements receive the tone using small antennas. The calibration transmit/receive elements that receive the tone measure the phase of the received tone. At least one back-end processor uses the measured phases to determine differential phases from a phase calibration table. Also, at least one back-end processor uses the differential phases to compute a change in apparent location of each transmitting calibration transmit/receive element.

18 Claims, 5 Drawing Sheets

U.S. PATENT DOCUMENTS

| | | | | |
|---|---|---|---|---|
| 2010/0253571 | A1* | 10/2010 | Scott | 342/174 |
| 2010/0321233 | A1* | 12/2010 | Ben-Zur et al. | 342/174 |
| 2011/0001660 | A1* | 1/2011 | Ray et al. | 342/174 |

OTHER PUBLICATIONS

Ray, G., et al. "Self-Calibrating Conformal (non-flat) Phased Array." Jan. 7, 2009.

PCT International Search Report for PCT/US2010/040674, Applicant: The Boeing Company, Form PCT/ISA/210 and 220, dated Oct. 1, 2010 (5pages).

PCT Written Opinion of the International Search Authority for PCT/US2010/040674, Applicant: The Boeing Company, Form PCT/ISA/237, dated Oct. 1, 2010 (4pages).

* cited by examiner

| Parameter | Descriptiion | Value |
|---|---|---|
| Delta_x | Distance between calibration elements in x direction | 0.1m |
| Delta_y | Distance between calibration elements in y direction | 0.1/ R rad |
| Nx | Number of elements in x direction | 16 |
| Ny | Number of elements in y direction | 8 |
| R | Radius of curvature of cylindrical array | 1.8m |
| MAXP | Maximum perturbation (uniformly distributed) | ±0.5cm |
| STDN_min | Minimum range noise (gaussian distributed) | 0.1mm |
| STDN_max | Maximum range noise (gaussian distributed) | 1mm |
| Nbd | Neighborhood for calibration | All calibration elements |

500

FIG. 5

SELF CALIBRATING CONFORMAL PHASED ARRAY

BACKGROUND

The present disclosure relates to self calibration. In particular, it relates to self calibrating conformal (non-flat) phased arrays.

Large phased arrays on airborne platforms suffer from continuously changing flexure that will degrade the generated beam patterns. Generally, there are two standard approaches to measure array flexure. The first approach is a mechanical approach that involves embedding a mesh of mechanical sensors across the array to measure strain and mechanical movement of the array. The second approach is a radio frequency (RF) approach that involves measuring the beam pattern externally and, from those measurements, inferring the element movement across the array.

The first approach, the mechanical approach, is quite expensive and requires a very complex calibration phase to turn mechanical strain readings into element movement. Also, the mechanical approach relies on embedding mechanical sensors within an electronic substrate, which is a difficult integration task. In addition, global errors from local strain readings increase as the array size increases. Additionally, without feedback generated from the actual beam pattern, this approach can drift out of calibration.

The second approach uses externally mounted horns or antennas to receive a calibration transmission from the array at certain angles. From these measurements, beam pattern anomalies can be detected and some phase corrections may be attempted. However, without a detailed knowledge of the spatial pattern at many simultaneous points, it is impossible to estimate flexure across the array to any great degree of precision. Because of the limited positions in which an external antenna could be mounted on an aircraft within viewing angles of the conformal array, this greatly limits the ability to do in-flight calibration and flexure estimation.

SUMMARY

The present disclosure relates to an apparatus, system, and method for self calibrating conformal (non-flat) phased arrays. Antenna beam patterns of phased arrays are degraded by continuously changing flexure of the array. In order to compensate for the flexure, the array must be continuously recalibrated to determine the updated position of each array element. The system of the present disclosure addresses the challenge of determining the updated positions of the array elements by providing a means for estimating the flexure of a conformal array in real-time in order for a beam-pointing algorithm to be adapted to the physical displacement of each array element. The disclosed system allows for an increase in the performance of the array, including maximizing gain and minimizing sidelobe levels and beamwidth.

In one or more embodiments, the system for a self calibrating conformal (non-flat) phased array involves a self calibrating conformal phased array comprising a plurality of transmit/receive elements; a plurality of embedded, calibration transmit/receive elements scattered across the array; and at least one back-end processor. In this system, the calibration transmit/receive elements are used to track any physical calibration transmit/receive element's relative position change caused by array flexure.

In one or more embodiments, each of the calibration transmit/receive elements transmit a tone using a small antenna, while the other calibration transmit/receive elements receive the tone using small antennas. In some embodiments, the small antennas are small monopole antennas. In at least one embodiment, the small monopole antennas are positioned vertical to the array.

In some embodiments, the other calibration transmit/receive elements that receive the tone measure the phase of the received tone. Also, in at least one embodiment, at least one back-end processor uses the measured phases to determine differential phases from a phase calibration table. Additionally, at least one back-end processor uses the differential phases to compute a change in apparent location of each transmitting calibration transmit/receive element.

In one or more embodiments, a method for tracking and calibrating a physical calibration element's relative position change caused by array flexure comprises transmitting a tone from each calibration transmit/receive element using a small antenna, and receiving the tone by other calibration transmit/receive elements using small antennas. In some embodiments, the method further comprises measuring the phase of the received tone; computing the differential phase from a phase calibration table; and computing the change in apparent location of each transmitting calibration transmit/receive element.

In some embodiments, the small antenna transmitting the tone is a small monopole antenna. In at least one embodiment, the small monopole antenna is positioned vertical to the array. Also, in one or more embodiments, the small antennas receiving the tone are small monopole antennas. In at least one embodiment, the small monopole antennas are positioned vertical to the array. In some embodiments, at least one back-end processor is used to compute the differential phase from the phase calibration table.

In one or more embodiments, a system for self calibrating comprises a plurality of embedded, calibration transmit/receive elements scattered across a structure, and at least one back-end processor. For this system, the calibration transmit/receive elements are used to track any physical calibration transmit/receive element's relative position change caused by structure flexure.

In some embodiments, for this system, each of the calibration transmit/receive elements transmit a tone using small antennas, and the other calibration transmit/receive elements receive the tone using small antennas. In some embodiments of this system, the small antennas are small monopole antennas. In at least one embodiment, the small monopole antennas are positioned vertical to the structure.

In one or more embodiments, the other calibration transmit/receive elements that receive the tone measure the phase of the received tone. In at least one embodiment, at least one back-end processor uses the measured phases to determine differential phases from a phase calibration table. In some embodiments, at least one back-end processor uses the differential phases to compute a change in apparent location of each transmitting calibration transmit/receive element.

The disclosed array and calibration method have many advantages, including allowing calibration transmit/receive (TR) elements to be placed anywhere on the array, wherever it is most convenient for the array element layout as well as wherever array movement needs to be most closely monitored. These many advantages are described in detail below.

A first advantage is that the calibration transmit/receive (TR) elements can operate at a much higher radio frequency (RF) than the rest of the array. Not only can these elements be made much smaller than the normal array elements, and possibly positioned in gaps within the original array, but these elements can be operated at the same time as the main array with sufficient front-end filtering. Thus, blanking intervals are not needed for calibration.

Table 1 below shows a listing of possible perturbation and monopole lengths for the calibration transmit/receive (TR) elements of the present disclosure.

TABLE 1

Unambiguous perturbation and monopole lengths

| Frequency (Ghz) | Unambiguous perturbation length (cm) | Monopole length (cm) |
|---|---|---|
| 1 | ±60 | 30 |
| 5 | ±12 | 6 |
| 10 | ±6 | 3 |
| 20 | ±3 | 1.5 |
| 50 | ±1.2 | 0.6 |
| 100 | ±0.6 | 0.3 |

A second advantage is that the choice of calibration element operation frequencies is flexible, and can be chosen based on both maximum flexure distances and sufficient frequency offset from the original array so that interference is minimized. A third advantage is that the calibration element locations can be chosen based on airframe structural members to which the array is attached. A study of vibration modes of the array manifold can be used to position the calibration elements to get the most accuracy from them.

A fourth advantage is that the calibration transmit (TX) elements only transmit a tone and, thus, no complex modulation is required at each element. A fifth advantage is that each calibration receive (RX) element is also very simple. Each calibration receive (RX) element measures and sends to the back-end processor a phase difference measurement between its own clock and that of the received calibration signal.

A sixth advantage is that the clock distribution is very simple for the calibration transmit/receive (TR) elements. A single clock can be distributed to all of the calibration transmit/receive (TR) elements without the need for synchronization across the array. All that is required is that the clock phases remain constant at the calibration transmit/receive (TR) elements.

A seventh advantage is that there are several different ways to compute the element positions. One method for the computation is taught in the present disclosure, but any other distributed-position estimation method could be employed for this system.

An eighth advantage is that the geometry of the conformal array is used in an essential way. The "non-flat" or "non-two-dimensional (non-2D)" nature of the conformal array allows for it to have diversity in the boresight direction of the array, which is due to the curvature of the conformal array. This allows for estimation of the third dimension of the array flexure. A pure flat two-dimensional (2D) array with no external components could not be used to estimate flexure in the third dimension due to the inherent ambiguity of not being able to distinguish inward flexure from outward flexure.

DRAWINGS

These and other features, aspects, and advantages of the present disclosure will become better understood with regard to the following description, appended claims, and accompanying drawings where:

FIG. 5 shows a table containing the parameters that are used in calibration simulation of the disclosed system, in accordance with at least one embodiment of the present disclosure.

DESCRIPTION

The methods and apparatus disclosed herein provide an operative system for self calibration. Specifically, this system allows for self calibration for conformal (non-flat) phased arrays. The system of the present disclosure provides a means for estimating the flexure of a conformal array in real-time in order for a beam-pointing algorithm to be adapted to the physical displacement of each array element. The disclosed system allows for an increase in the performance of the array, including maximizing gain and minimizing sidelobe levels and beamwidth.

The system of the present disclosure involves a self calibrating conformal array that uses its non-flat array shape to perform three-dimensional (3D) flexure estimation. From the flexure estimation, calibration settings are updated to be used in beam pointing algorithms for the array.

The array of the disclosed system employs a small number of embedded calibration transmit/receive (TR) elements scattered across the array. After initial calibration of the array, any physical calibration element's relative position changes caused by array flexure will be tracked through a simple process. The process includes the following steps: each calibration transmit/receive (TR) element successively transmits a tone using a small monopole antenna that is positioned vertical to the array manifold; every other calibration transmit/receive (TR) element receives this tone and measures the phase; at least one back-end processor uses the measured phases to determine the differential phases from the phase calibration table; and at least one back-end processor computes the change in apparent location of each transmitting calibration transmit/receive (TR) element.

In one or more embodiments, the disclosed system of utilizing a number of embedded calibration transmit/receive (TR) elements to determine flexure may be employed with various other structures than antenna arrays. Types of structures that may be used with the disclosed system include, but are not limited to, bridges, buildings, and spacecraft housing.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
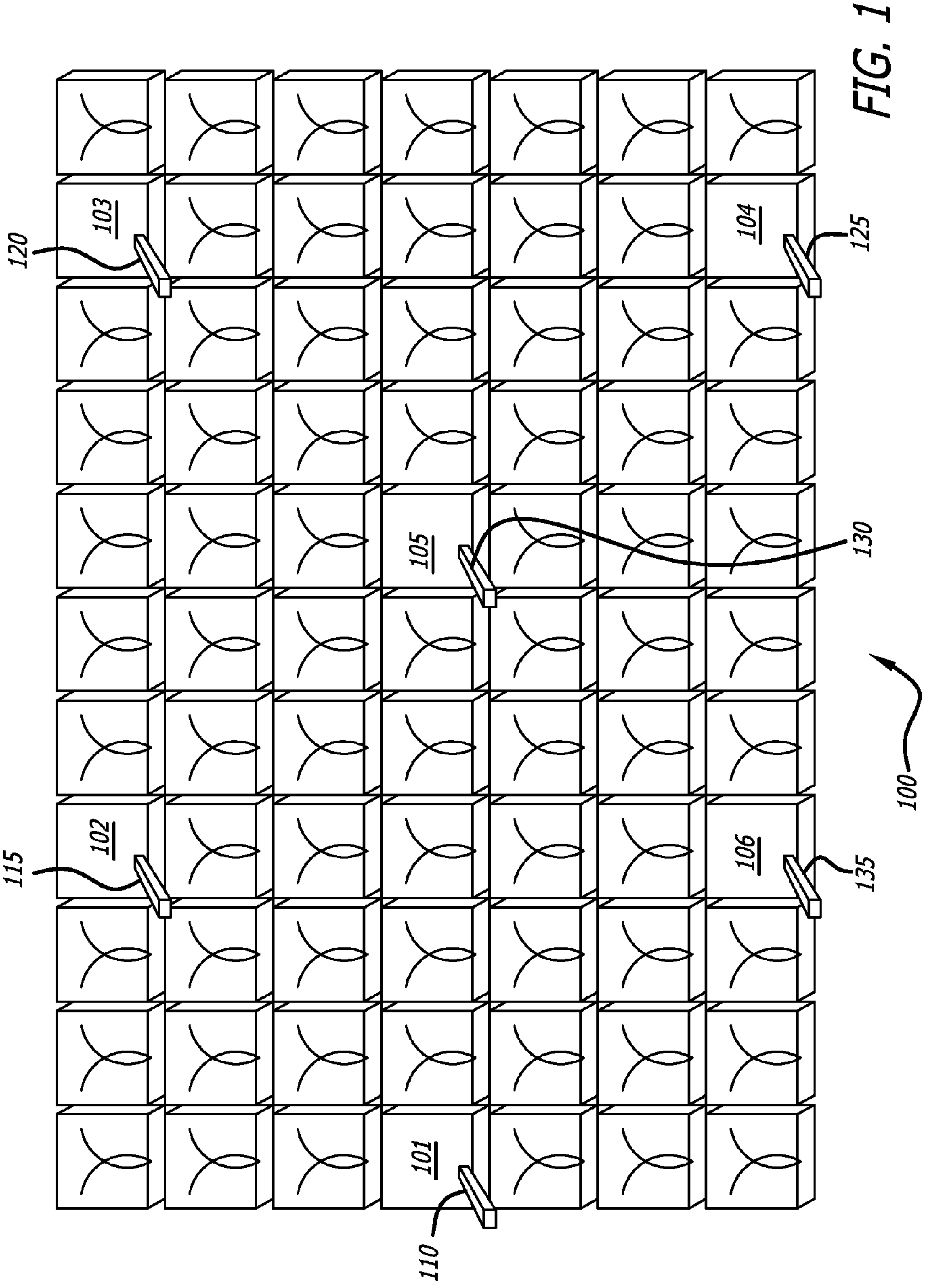
FIG. 1 is an illustration of a self calibrating conformal array with interspersed calibration transmit/receive (TR) elements, in accordance with at least one embodiment of the present disclosure.

FIG. 1 illustrates a self calibrating conformal array with interspersed calibration transmit/receive (TR) elements, in accordance with at least one embodiment of the present disclosure. In this figure, a self calibrating array 100 is shown having six interspersed calibration transmit/receive (TR) elements 101, 102, 103, 104, 105, 106. Each calibration transmit/receive (TR) element 101, 102, 103, 104, 105, 106 is depicted as including a monopole antenna 110, 115, 120, 125, 130, 135 that is positioned vertical to the array.

Figure 2:
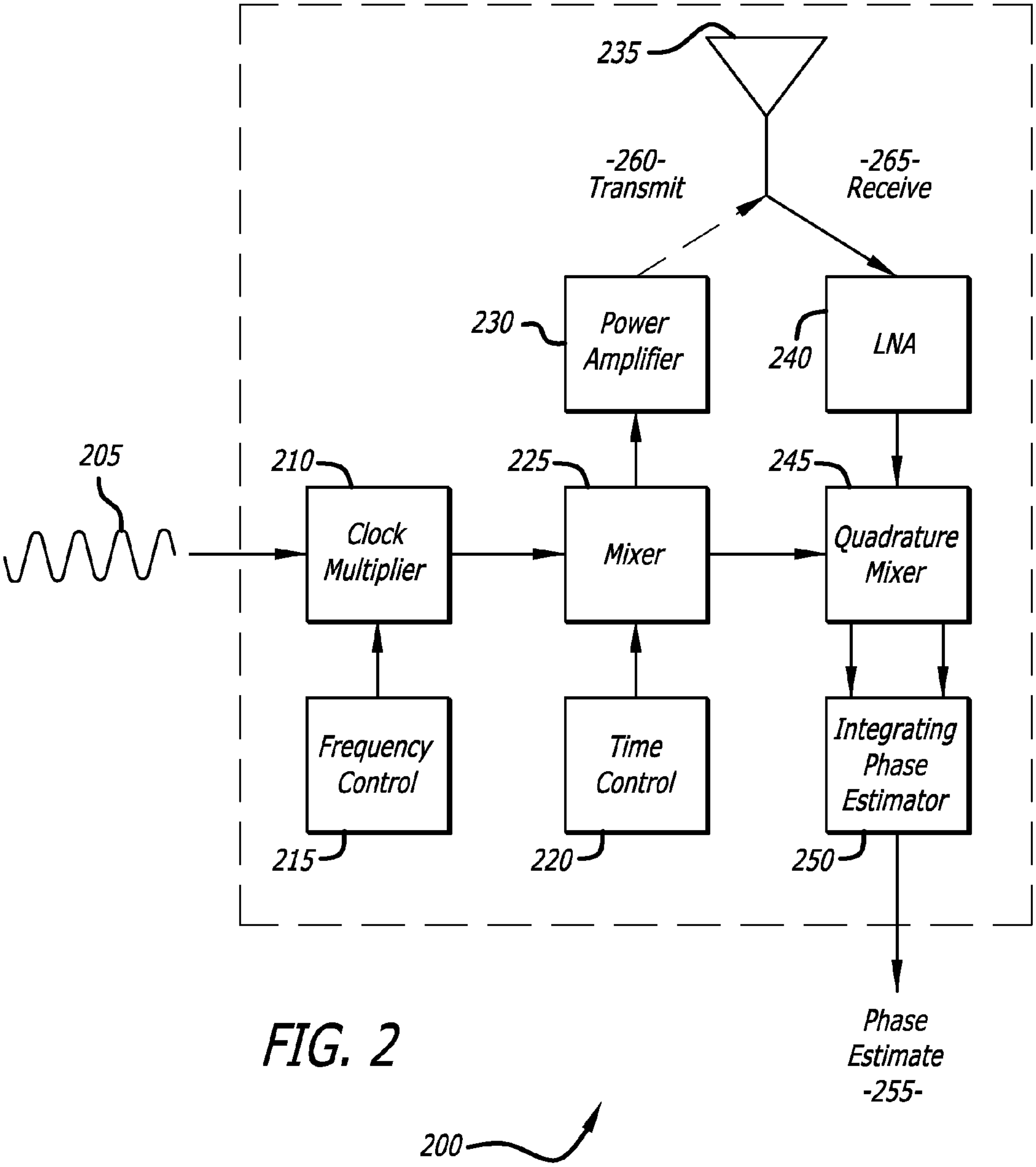
FIG. 2 depicts a block diagram of a calibration transmit/receive (TR) element, in accordance with at least one embodiment of the present disclosure.

FIG. 2 depicts a block diagram of a calibration transmit/receive (TR) element, in accordance with at least one embodiment of the present disclosure. In this figure, the block diagram 200 shows the communication units that are included in an individual calibration transmit/receive (TR) element. In this block diagram 200, waveform 205 is inputted into a clock multiplier 210. Also, the output of a frequency control unit 215 is inputted into the clock multiplier 210.

The output of the clock multiplier 210 is inputted into a mixer 225. In addition, the output of a time control unit 220 is inputted into the mixer 225. The output of the mixer is inputted separately into a power amplifier 230 and a quadrature mixer 245. The power amplifier 230 transmits 260 a signal through the calibration element's antenna 235.

The calibration element's antenna 235 also receives 265 signals. After the calibration element's antenna 235 receives 265 a signal, the received signal is inputted into a low noise amplifier (LNA) 240. The output of the LNA is inputted into the quadrature mixer 245. The output of the quadrature mixer 245 is then inputted into an integrating phase estimator 250, which outputs a phase estimate 255 of the received signal.

Table 1 above shows the maximum unambiguous perturbation length that can be measured for a given frequency of calibration tone. This table also shows the λ/4 length of an optional monopole antenna, which is attached to each calibration array element and used to help with the reception and transmission of calibration tones across the curved array. It is evident from the table that higher frequencies allow for shorter λ/4 monopoles, but have greater problems with ambiguities for perturbation lengths. Thus, a design trade is necessary when choosing the best calibration frequency to be used for the system.

Flexure estimation involves a design step and a two-step calibration process. The design step is discussed in detail in the Element Displacement Estimation section below. The calibration process includes a first step and a second step. The first step of the calibration process is the initial calibration, where clock synchronization effects and array propagation effects are estimated. The second step of the calibration process requires subsequent ongoing adaptive calibration to estimate the physical element movement and the corresponding array beam-forming changes over time. During this step, the system estimates flexure of a conformal array in real-time so that the beam pointing algorithm can be continuously adapted to the displacement of each array element. This increases the performance of the array, which includes maximizing the gain as well as minimizing the sidelobe levels and beamwidth.

Flexure estimation using element perturbation estimation can be computed using modifications to algorithms from many different areas of study. One area of study involves guidance and navigation algorithms that are used for solving global positioning system (GPS) equations. Many different algorithms used for solving GPS have been published in the area of guidance and navigation. These algorithms use range measurements from the GPS satellites in view of a GPS receiver to compute the location and clock offset of the GPS receiver. By reversing this picture, similar equations can be used to compute calibration element locations from phase change estimates that are converted to ranges.

Another area of study involves sensor network localization. Many papers have been published in the area of sensor network localization. The object of sensor network localization is to use range/delay estimates to self-locate all of the sensors in a sensor network. Theses algorithms range from iterative to subnetwork methods to full network optimization algorithms. Equations similar to these algorithms may be used for calculating the calibration element locations for the disclosed system.

Yet another area of study is multilateration. Multilateration occurs when several receivers simultaneously receive and geolocate a signal transmission. These algorithms typically use time-of-arrival (TOA) for cooperative or time-difference-of-arrival (TDOA) for noncooperative signals to estimate the location of the signal transmission. For this system, equations that are similar to these algorithms may be employed for computing the calibration element locations.

Below is a mathematical description of one method for estimating element displacement for one or more embodiments of the present disclosure. This analytic method is from the area of study that involves guidance and navigation algorithms that are used for solving global positioning system (GPS) equations. It should be noted that many different analytic methods may be utilized to estimate the calibration element locations for alternative embodiments of the disclosed system.

Given n active receivers with antenna phase centers at perturbed positions $\{s_i+\Delta s_i | 1 \leqq i \leqq n\}$ and one perturbed transmitter antenna phase center at position x+Δx. (Note that x is actually one of the calibration elements that will act as a receiver at another stage in the flexure estimation process. The temporary notation is used here to distinguish the two distinct roles played by transmitter and receiver with "unknown" and "known" positions.) The following method produces an estimate of Δx given the positions $\{s_i\}$ where each $\Delta s_i$ is assumed to be zero) and phase delay measurements $\{p_i | 1 \leqq i \leqq n\}$ from transmitting a tone at position x and measuring the phase delay at each $s_i$.

Each transmitter and receiver is driven by and coherent with a single clock that has been distributed over the entire array. Each clock has a clock offset $\{b_i\}$ with $b_1=0$ at node 1 acting as the reference. These offsets can be measured during the initial laboratory calibration by transmitting on node i and receiving on node j and then reversing transmitter and receiver. If t is the propagation time between the two antenna phase centers, then the first transmission sees a delay of $t+b_j-b_i$ while the other sees $t+b_i-b_j$. This allows the solution of the clock offset difference $b_i-b_j$. With the reference node given a "zero" clock offset, all offsets can be solved for. In fact, this process measures all of the different contributing biases and estimates the total differential bias from node i to node j.

If f is the frequency of the calibration nodes transmission with RF wavelength λ=c/f, then a phase measurement between a tone transmitted at x and one generated by the local clock of node i using a method such as a quadrature mixer gives (after calibration) a time delay proportional to the propagation distance modulo λ between the two antennas. Design and laboratory measurements give the positions of all the array elements to within ±/2, so $$t_i=\|x-s_i\|=n_i\lambda+cp_i$$

where the integer $n_i$ is chosen for the correct number of wavelengths based on the designed distance.

The following describes a single solution for one transmitter and n receivers. The solution of the position of x (and hence the estimate of Δx) given the assumed correct positions of $s_i$ proceeds as follows. Assume that node x has a small unknown clock offset after all calibrations have been taken into account. Set $$t_i=n_i\lambda+cp_i+b.$$

Define the n 1×4 vectors $$a_i = \left[s\frac{T}{i}, t_i\right].$$

Define $\langle a,b \rangle = a_1b_1+a_2b_2+a_3b_3-a_4b_4$.

Define $$A=[a_1, a_2, \ldots a_n]^T$$

$$i_0=[1, 1, \ldots, 1]^T$$

$$r=[r_1, r_2, \ldots, r_n]^T$$

where $$r_i=\langle a_i,a_i \rangle/2.$$

Compute the generalized inverse $B=(A^TWA)^{-1} A^TW$ where W is a symmetric positive definite weighting matrix based on the estimated measurement errors of $t_i$ and previous estimated perturbations of $s_i$. W can, however, be the identity matrix and the method will work just fine. Set $$v=Br$$

$$E=\langle u,u \rangle$$

$$F=\langle u,v \rangle-1$$

$$G=\langle v,v \rangle.$$

Solve the quadratic equation $Ez^2+2Fz+G=0$ for two values $z_1$ and $z_2$. Then set the two 4 vectors $[x^T, -b]=z_{1,2}U+v$ to give two [position, offset] estimates for x and b, only one of which will satisfy the range equations.

In one or more embodiments, the sequence of calibration element design steps is as follows.

Step 1, estimate maximum displacement of any point from initial (unstressed) location within active portion of conformal array.

Step 2, from mechanical modes of the enveloping airframe structure, estimate the minimum number of sampling points necessary to characterize the flexure and define where they can be placed on the conformal array.

Step 3, from the sampling points, estimate the maximum range differences possible for the processing neighborhoods, denoted by $\pm\Delta R_{max}$.

Step 4, calculate the maximum frequency $f_{max}=2c/\Delta R_{max}$ to use in order to avoid ambiguities when converting phase differences to ranges.

Step 5, design the monopole antennas with physical offsets from the honeycomb array structure so that the requirements in the following areas are met. The first requirement involves aircraft performance requirements (e.g., airflow resistance), which require a limited offset distance. The second requirement involves limitations of the geometric diversity of the conformal array in the z dimension (boresight), which will limit the ultimate accuracy. Offsetting the monopole phase centers can further increase the z dimension diversity. A design trade is necessary to determine if the accuracy will be sufficient.

The third requirement involves multipath and electromagnetism (EM) blockage considerations, which will limit the range of each calibration transmission (e.g., the array may be curved so much that one part of the conformal array is not visible from the other side). The amount of blockage determines the neighborhoods of the elements on the array that are capable of calibration operation.

The sequence of overall calibration processing steps is as follows.

Step 1 is the initial calibration that is used to estimate the calibration element clock and miscellaneous biases, as were described above.

Step 2 involves computing integer $\{n_i\}$ wavelength estimates for each inter-calibration element distance.

Step 3 involves estimating the appropriate array calibration element neighborhoods. This step defines for each transmitting node k, the set of receiving nodes appropriate for calibration. As such, there must be a direct path between the two nodes, and the signal strength must be high enough for good phase estimates. The amount of curvature of the array, antenna heights, and flexure sampling density from the calibration elements all effect the neighborhood size.

The sequence of flexure estimation steps is as follows.

Step 1, for each calibration transmitter node i, solve for its position and, hence, its displacement from the original designed position by assuming all of the receiving nodes have no displacement from their original designed position. This produces a set $\{\Delta x_i\}$ of displacement estimates.

Step 2, subtract the displacement estimate from each node's position.

Step 3, repeat step 1, and solve for the displacement estimates with the new updated element positions.

Step 4, repeat steps 1 through 3 until the overall range errors across the array have been reduced below a predefined threshold value.

Simulation Results

The algorithm described above has been implemented with simulated arrays. The simulation results show how well the algorithm operates on simulated flexures.

Figure 3:
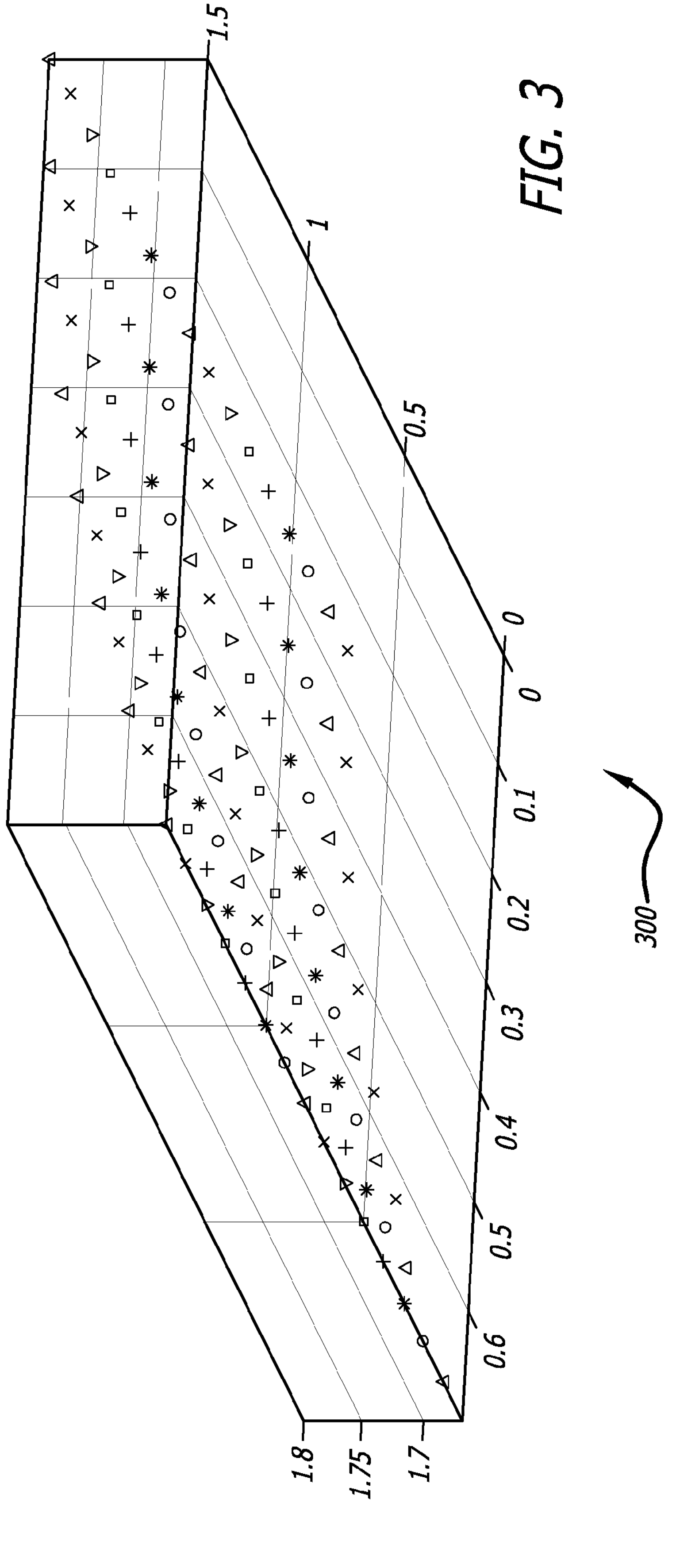
FIG. 3 shows a plot that indicates the locations of calibration transmit/receive (TR) elements in a cylindrical array, in accordance with at least one embodiment of the present disclosure.
Figure 4:
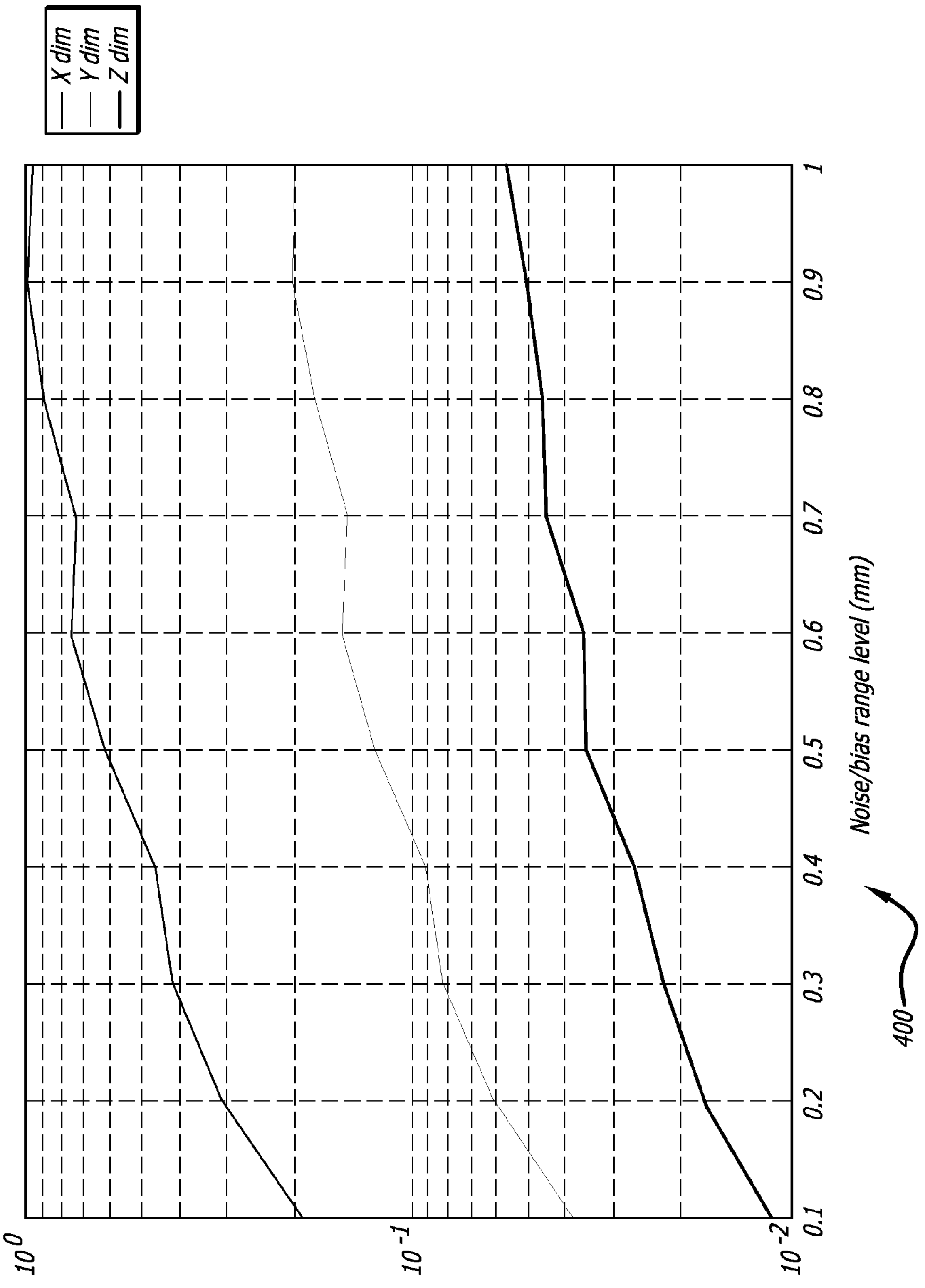
FIG. 4 illustrates a chart showing the performance of flexure estimation as a function of noise and uncorrected biases, in accordance with at least one embodiment of the present disclosure.

FIG. 4 illustrates a chart 400 showing the performance of flexure estimation as a function of noise and uncorrected biases, in accordance with at least one embodiment of the present disclosure. In particular, this figure shows the performance as a function of noise for a particular 8×16 cylindrical array. The z axis is perpendicular to the array, which is wrapped onto a 1.8 meter radius (representing a similar fuselage to a 74 inch diameter 737-800), but is mostly flat. FIG. 3 shows a plot 300 that indicates the locations of the calibration transmit/receive (TR) elements for this particular cylindrical array.

The noise and biases are introduced as a uniform random error in the range measurements. The level is normalized to distance, so an error of 0.001 meter=1 millimeter corresponds to a maximum error of 1 millimeter seen across the entire array. Since bias error will likely dominate in a real implementation, no distance dependency has been added to the model. The various parameter settings used for this simulation are shown in FIG. 5.

As can be seen in FIG. 4, the z axis perturbation error is much greater due to the limited diversity of the calibration array in the z dimension. As such, the diversity of calibration element locations will drive the accuracy of the final perturbation estimates.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A self calibrating conformal phased array, comprising:

a plurality of transmit/receive elements;

a plurality of embedded, calibration transmit/receive elements scattered across the array;

wherein the calibration transmit/receive elements are used to track any physical calibration transmit/receive element's relative position change caused by array flexure; and at least one back-end processor, wherein each of the calibration transmit/receive elements transmit a tone using a small antenna, and wherein the other calibration transmit/receive elements receive the tone using small antennas.

2. The self calibrating conformal phased array of claim 1, wherein the small antennas are small monopole antennas.

3. The self calibrating conformal phased array of claim 2, wherein the small monopole antennas are positioned vertical to the array.

4. The self calibrating conformal phased array of claim 1, wherein the other calibration transmit/receive elements that receive the tone measure the phase of the received tone.

5. The self calibrating conformal phased array of claim 4, wherein the at least one back-end processor uses the measured phases to determine differential phases from a phase calibration table.

6. The self calibrating conformal phased array of claim 5, wherein the at least one back-end processor uses the differential phases to compute a change in apparent location of each transmitting calibration transmit/receive element.

7. A method for tracking and calibrating a physical calibration element's relative position change caused by array flexure, the method comprising:

transmitting a tone from each calibration transmit/receive element using a small antenna;

receiving the tone by other calibration transmit/receive elements using small antennas;

measuring a phase of the received tone;

computing a differential phase from a phase calibration table; and computing a change in apparent location of each transmitting calibration transmit/receive element.

8. The method of claim 7, wherein the small antenna transmitting the tone is a small monopole antenna.

9. The method of claim 8, wherein the small monopole antenna is positioned vertical to the array.

10. The method of claim 7, wherein the small antennas receiving the tone are small monopole antennas.

11. The method of claim 10, wherein the small monopole antennas are positioned vertical to the array.

12. The method of claim 7, wherein at least one back-end processor is used to compute the differential phase from the phase calibration table.

13. A self calibrating system, the system comprising:

a plurality of embedded, calibration transmit/receive elements scattered across a structure, wherein the calibration transmit/receive elements are used to track any physical calibration transmit/receive element's relative position change caused by structure flexure; and at least one back-end processor, wherein each of the calibration transmit/receive elements transmit a tone using small antennas, and wherein the other calibration transmit/receive elements receive the tone using small antennas.

14. The self calibrating system of claim 13, wherein the small antennas are small monopole antennas.

15. The self calibrating system of claim 14, wherein the small monopole antennas are positioned vertical to the structure.

16. The self calibrating system of claim 13, wherein the other calibration transmit/receive elements that receive the tone measure the phase of the received tone.

17. The self calibrating system of claim 16, wherein the at least one back-end processor uses the measured phases to determine differential phases from a phase calibration table.

18. The self calibrating system of claim 17, wherein the at least one back-end processor uses the differential phases to compute a change in apparent location of each transmitting calibration transmit/receive element.

* * * * *